(12) United States Patent  
Zhou

(10) Patent No.: US 12,411,794 B2  
(45) Date of Patent: Sep. 9, 2025

(54) DEVICES, SYSTEMS, AND METHODS FOR CONTROLLING COMMUNICATION BETWEEN APPARATUSES

(71) Applicant: SHANGHAI UNITED IMAGING HEALTHCARE CO., LTD., Shanghai (CN)

(72) Inventor: Xiaofeng Zhou, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 133 days.

(21) Appl. No.: 18/354,724

(22) Filed: Jul. 19, 2023

(65) Prior Publication Data

US 2023/0367736 A1   Nov. 16, 2023

Related U.S. Application Data

(63) Continuation of application No. PCT/CN2022/074909, filed on Jan. 29, 2022.

(30) Foreign Application Priority Data

Jan. 29, 2021 (CN) .......................... 202110128653.8

(51) Int. Cl.
G06F 13/42     (2006.01)

(52) U.S. Cl.
CPC .. *G06F 13/4221* (2013.01); *G06F 2213/0026* (2013.01)

(58) Field of Classification Search
CPC ................. G06F 13/4221; G06F 2213/0026
See application file for complete search history.

(56) References Cited

U.S. PATENT DOCUMENTS 9,501,125 B2 * 11/2016 Walsh .................. G06F 1/3203  
10,061,282 B2 * 8/2018 Kanda .................. G06F 1/3293  
(Continued)

FOREIGN PATENT DOCUMENTS

CN       103198034 A      7/2013  
CN       104133533 A      11/2014  
(Continued)

OTHER PUBLICATIONS

International Search Report in PCT/CN2022/074909 mailed on Apr. 26, 2022, 5 pages.

(Continued)

*Primary Examiner* — Henry Tsai  
*Assistant Examiner* — Christopher A Daley  
(74) *Attorney, Agent, or Firm* — METIS IP LLC

(57) ABSTRACT

The present disclosure provides devices, methods, and systems for controlling a connection, via a communication apparatus, between a first apparatus and a second apparatus. For instance, the methods may include generating a connection signal in response to determining that a second apparatus has established a new connection with the communication apparatus; generating a control signal based on the connection signal; and changing, based on the control signal, a connection state between the first apparatus and the communication apparatus to cause a new connection relationship between the first apparatus and the second apparatus to be established for a communication between the first apparatus and the second apparatus.

20 Claims, 7 Drawing Sheets

(56) References Cited

U.S. PATENT DOCUMENTS

| | | | |
|---|---|---|---|
| 10,223,318 B2* | 3/2019 | Koriginja Ramaswamy | G06F 11/27 |
| 11,940,942 B2* | 3/2024 | Jeon | G06F 13/4221 |
| 11,966,595 B2* | 4/2024 | Kinsley | G06F 3/0625 |
| 12,164,448 B2* | 12/2024 | Doddi | G06F 1/3287 |
| 2011/0219165 A1 | 9/2011 | Rui | |
| 2016/0161931 A1* | 6/2016 | Kanda | G06K 15/4055 700/20 |
| 2017/0011002 A1 | 1/2017 | Shin | |
| 2018/0081843 A1* | 3/2018 | Kadgi | G06F 1/1632 |
| 2018/0349310 A1* | 12/2018 | Koriginja Ramaswamy | G06F 13/4081 |
| 2019/0278496 A1* | 9/2019 | Rowley | G06F 3/0679 |
| 2021/0224214 A1 | 7/2021 | Zhang et al. | |
| 2023/0086027 A1* | 3/2023 | Pillai | G06F 11/0751 714/57 |
| 2023/0214348 A1 | 7/2023 | Zhang | |

FOREIGN PATENT DOCUMENTS

| | | |
|---|---|---|
| CN | 106959932 A | 7/2017 |
| CN | 108040301 A | 5/2018 |
| CN | 109542198 A | 3/2019 |
| CN | 208985150 U | 6/2019 |
| CN | 111339010 A | 6/2020 |
| CN | 111737698 A | 10/2020 |
| CN | 111817904 A | 10/2020 |
| CN | 111835631 A | 10/2020 |
| CN | 111858431 A | 10/2020 |
| WO | 2022161486 A1 | 8/2022 |

OTHER PUBLICATIONS

Written Opinion in PCT/CN2022/074909 mailed on Apr. 26, 2022, 6 pages.

First Office Action in Chinese Application No. 202110128653.8 mailed on Aug. 2, 2022, 19 pages.

The Extended European Search Report in European Application No. 22745358.6 mailed on Apr. 29, 2024, 7 pages.

* cited by examiner

DEVICES, SYSTEMS, AND METHODS FOR CONTROLLING COMMUNICATION BETWEEN APPARATUSES

CROSS-REFERENCE TO RELATED APPLICATIONS

This application is a continuation of International Application No. PCT/CN2022/074909, filed on Jan. 29, 2022, which claims priority to Chinese Application No. 202110128653.8 filed on Jan. 29, 2021, the entire contents of each of which are hereby incorporated by reference.

TECHNICAL FIELD

The present disclosure generally relates to the field of communication technology, and more particularly, relates to devices, systems, and methods for controlling communication between apparatuses.

BACKGROUND

The Peripheral Component Interconnect Express (PCIe) standard is a high-speed serial computing apparatus expansion bus standard. The PCIe standard has now developed to the fifth generation with a communication rate of up to 32 Gbps. With the substantial increase in communication rates, and in order to meet the needs of long-distance transmission, a PCIe communication system using the PCIe protocol has been widely used.

Conventionally, to establish a connection between PCIe apparatus(s) and a computing apparatus in the PCIe communication system, the PCIe apparatus and the communication apparatus need to be powered on before the computing apparatus is powered on. If the PCIe apparatus(s) is powered on after the computing apparatus, the computing apparatus does not identify that the PCIe apparatus(s) are connected. Thus, if a PCIe apparatus is accidentally powered off and then powered on, the computing apparatus needs to be restarted to connect with the PCIe apparatus. The restarting of the computing apparatus is time-consuming and may bring much inconvenience to a user. Therefore, it is desired to provide more efficient manners for controlling the connection between the PCIe apparatus and the computing apparatus.

SUMMARY

According to an aspect of the present disclosure, a device for controlling a connection between a first apparatus and a second apparatus via a communication apparatus is provided. The device may include a connection monitoring module, a logic processing module, and a connection control module. The connection monitoring module may be configured to, in response to a determination that the second apparatus has established a new connection with the communication apparatus, send a connection signal to the logic processing module. The logic processing module may be configured to send a control signal to the connection control module based on the connection signa. The connection control module may be configured to change, based on the control signal, a connection state between the first apparatus and the communication apparatus to cause a new connection relationship between the first apparatus and the second apparatus to be established for a communication between the first apparatus and the second apparatus.

In some embodiments, the communication apparatus may include a routing component based on a Peripheral Component Interconnect Express (PCIe) protocol, and the second apparatus includes a PCIe device.

In some embodiments, an output end of the connection monitoring module may be connected with a first input end of the logic processing module, and an output end of the logic processing module may be connected with an input end of the connection control module.

In some embodiments, the device may further include a switch module. An output end of the connection control module may be connected with the switch module. Both ends of the switch module may be connected with a detection pin of the communication apparatus. To change the connection state between the communication apparatus and the first apparatus, the connection control module is configured to: cause, based on the control signal, the switch module to be turned on, and then after a preset period, cause the switch module to be turned off.

In some embodiments, when the switch module is turned on, detection pins of the communication apparatus may be disconnected to cause the first apparatus to be communicatively disconnected with the communication apparatus. When the switch module is turned off, the switch module may be configured to connect the detection pins of the communication apparatus to cause a new connection to be established between the first apparatus and the communication apparatus.

In some embodiments, when the switch module is turned on, a first detection pin may be disconnected with a second detection pin to generate a first logic level transition of a signal relating to a fourth detection pin. The first logic level transition may cause the first apparatus to be communicatively disconnected with the communication apparatus. The first detection pin and the second detection pin may be disposed in an interface of the communication apparatus, the third detection pin and the fourth detection pin being disposed in an interface of the first apparatus. When the switch module is turned off, the first detection pin may be connected with the second detection pin to generate a second logic level transition of a signal relating to the fourth detection pin. The second logic level transition may cause the new connection to be established between the first apparatus and the communication apparatus.

In some embodiments, the interface of the first apparatus may include a slot, the third detection pin may be grounded, and the fourth detection pin may be connected with a slot power source.

In some embodiments, to cause the first apparatus to be communicatively disconnected with the communication apparatus, the first logic level transition may cause the first apparatus to turn off a slot clock and the slot power source; and to cause the new connection to be established between the first apparatus and the communication apparatus, the second logic level transition may cause the first apparatus to turn on the slot clock and the slot power source.

In some embodiments, an initial state of the switch module may be a turned-off state.

In some embodiments, the device may further include a voltage monitoring module configured to: monitor a first input voltage of the communication apparatus and a second input voltage of the device; and in response to a determination that the first input voltage is greater than a first threshold and the second input voltage is greater than a second threshold, send an enable signal to the logic processing module for sending the control signal to the connection control module.

In some embodiments, to send the control signal to the connection control module based on the connection signal, the logic processing module is configured to: in response to receiving the enable signal, obtaining, based on the connection signal, the control signal; and send the control signal to the connection control module based on the connection signal.

In some embodiments, the enable signal may indicate a transition from a logic-high level to a logic-low level or a transition from a logic-low level to a logic-high level.

In some embodiments, the device may further include a power source module configured to: convert the first input voltage to the second input voltage, and supply power to at least one of the voltage monitoring module, the connection monitoring module, the logic processing module or the connection control module.

In some embodiments, the connection monitoring module may include a repeater, and to determine that the second apparatus has established a new connection with the communication apparatus, the connection monitoring module is configured to: determine that the second apparatus has established the new connection with the communication apparatus based on data of the second apparatus recorded in an internal register of the repeater.

In some embodiments, the connection monitoring module may include a switch chip of the communication apparatus, and to determine that the second apparatus has established a new connection with the communication apparatus, the connection monitoring module is configured to: determine whether there is a state change of a node switching signal of the switch chip.

In some embodiments, to determine that the second apparatus has established the new connection with the communication apparatus, the connection monitoring module may be configured to: in response to determining that the node switching signal transits from a logic-high level to a logic-low level or from a logic-low level to a logic-high level, determine that the second apparatus has established the new connection with the communication apparatus.

In some embodiments, the at least one second apparatus has established the new connection with the communication apparatus indicates communication between the second apparatus and the communication apparatus is normal.

According to another aspect of the present disclosure, a communication apparatus is provided. The communication apparatus may include the device for controlling the connection between a first apparatus and a second apparatus via a communication apparatus. The device may include a connection monitoring module, a logic processing module, and a connection control module. The connection monitoring module may be configured to, in response to a determination that the second apparatus has established a new connection with the communication apparatus, send a connection signal to the logic processing module. The logic processing module may be configured to send a control signal to the connection control module based on the connection signa. The connection control module may be configured to change, based on the control signal, a connection state between the first apparatus and the communication apparatus to cause a new connection relationship between the first apparatus and the second apparatus to be established for a communication between the first apparatus and the second apparatus.

According to yet another aspect of the present disclosure, a system is provided. The system may include a first apparatus, a second apparatus, and the communication apparatus. The second apparatus may be communicatively connected with the first apparatus through the communication apparatus.

According to still another aspect of the present disclosure, a method is provided. The method may be implemented on a device for controlling a connection, via a communication apparatus, between a first apparatus and a second apparatus. The method may include generating a connection signal in response to determining that the second apparatus has established a new connection with the communication apparatus; generating a control signal based on the connection signal; and changing, based on the control signal, a connection state between the first apparatus and the communication apparatus to cause a new connection relationship between the first apparatus and the second apparatus to be established for a communication between the first apparatus and the second apparatus.

According to still another aspect of the present disclosure, a system is provided. The system may include at least one non-transitory storage medium including a set of instructions for controlling a connection, via a communication apparatus, between a first apparatus and a second apparatus; and at least one processor in communication with the at least one non-transitory storage medium. When executing the set of instructions, the at least one processor is configured to cause the system to perform operations including: generating a connection signal in response to determining that the second apparatus has established a new connection with the communication apparatus; generating a control signal based on the connection signal; and changing, based on the control signal, a connection state between the first apparatus and the communication apparatus to cause a new connection relationship between the first apparatus and the second apparatus to be established for a communication between the first apparatus and the second apparatus.

According to still another aspect of the present disclosure, a non-transitory computer readable medium is provided. The non-transitory computer readable medium may include at least one set of instructions. When executed by at least one processor of a computing device, the at least one set of instructions may direct the at least one processor to perform operations including: generating a connection signal in response to determining that the second apparatus has established a new connection with the communication apparatus; generating a control signal based on the connection signal; and changing, based on the control signal, a connection state between the first apparatus and the communication apparatus to cause a new connection relationship between the first apparatus and the second apparatus to be established for a communication between the first apparatus and the second apparatus.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are nonlimiting exemplary embodiments, in which like reference numerals represent similar structures throughout the several views of the drawings, and wherein.

DETAILED DESCRIPTION

Figure 1:
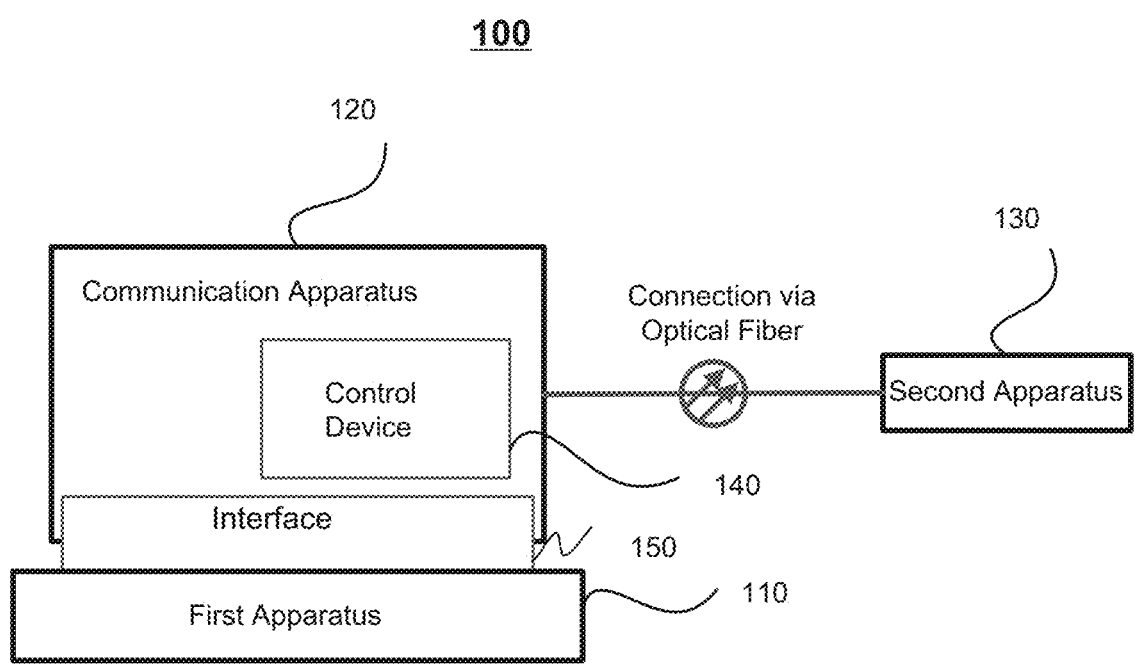
FIG. 1 is a schematic diagram illustrating an exemplary communication system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that when a unit, engine, module, or block is referred to as being "on," "connected to," or "coupled to," another unit, engine, module, or block, it may be directly on, connected or coupled to, or communicate with the other unit, engine, module, or block, or an intervening unit, engine, module, or block may be present unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The present disclosure provides mechanisms including devices, methods, and systems for implementing a hot plug manner of establishing the connection relationship between a first apparatus (e.g., a computing apparatus) and a second apparatus (e.g., a PCIe apparatus) via a communication apparatus. For instance, the method may include generating a connection signal in response to determining that a second apparatus has established a new connection with the communication apparatus; generating a control signal based on the connection signal; and changing, based on the control signal, a connection state between the first apparatus and the communication apparatus to cause a new connection relationship between the first apparatus and the second apparatus to be established for communication between the first apparatus and the second apparatus.

FIG. 1 is a schematic diagram illustrating an exemplary communication system according to some embodiments of the present disclosure.

The communication system 100 shown in FIG. 1 may include a first apparatus 110, at least one communication apparatus 120, and at least one second apparatus 130. An upstream link of the communication system 100 may refer to the connection of the first apparatus 110 with at least one communication apparatus 120. A downstream link of the communication system 100 may refer to the connection of the at least one communication apparatus 120 with at least one second apparatus 130.

In the upstream link of the communication system 100 shown in FIG. 1, a communication apparatus 120 (e.g., a routing apparatus) may be communicatively connected with the first apparatus 110 through an interface 150. The interface 150 may include a first interface implemented on the first apparatus 110 and a second interface implemented on the communication apparatus 120. One or more second apparatuses 130 may be connected with a single communication apparatus 120 so that a connection may be established between the first apparatus 110 and the second apparatus(es) 130 via the communication apparatus 120. In the following description, a single second apparatus and a single communication apparatus are mentioned as an example. It should be noted that there may be multiple second apparatuses and/or multiple communication apparatuses in the communication system 100.

As used herein, the term "connection" refers to a communicative connection. If the first apparatus 110 and the second apparatus 130 are connected (either directly or indirectly through another device such as the communication apparatus 120), the first apparatus 110 and the second apparatus 130 may be able to communicate with each other. For example, if an interface of the second apparatus 130 has just been physically attached to the interface of the communication apparatus 120, and the communication apparatus and the second apparatus 130 are both in a powered-on state, a first connection (which is a new connection) may be established between the second apparatus 130 and the communication apparatus 120. As another example, when the interface of the second apparatus 130 remains physically attached to the interface of the communication apparatus 120, if the second apparatus 130 is powered off (e.g., for repair, replacement, or upgrade), the communication apparatus 120 cannot communicate with the second apparatus 130. Thus, the first connection between the second apparatus 130 and the communication apparatus 120 is interrupted. When the second apparatus 130 is powered on again, a second connection (also referred to as a new connection) may need to be established between the communication apparatus 120 and the second apparatus 130. As still another example, when an interface of the second apparatus 130 remains physically attached to the interface of the communication apparatus 120, a new connection may also be established between another second apparatus 130 and the communication apparatus 120.

In some embodiments, the first apparatus 110 may be a computing apparatus capable of receiving data, processing data, and/or transmitting data to other devices (e.g., the second apparatus 130). For example, the first apparatus 110 may include a computer, a server, etc. The second apparatus 130 may be an apparatus that can communicate with the first apparatus 110 using a specific communication protocol. For instance, the second apparatus may be an Ethernet adapter, an audio card, an add-in card, a storage device, an external processing device, or the like, or any combination thereof. In some embodiments, the second apparatus may be connected with the communication apparatus 120 through an optical fiber for high-speed data transmission.

In some embodiments, the communication apparatus 120 may include a routing component utilizing a communication protocol such as the PCIe protocol. The communication apparatus 120 may enable the first apparatus 110 to be connected to multiple apparatuses (e.g., one or more second apparatuses 130) through a single interface implemented on the first apparatus 110. The communication apparatus 120 may convert an optical signal received from the second apparatus 130 through the optical fiber into an electrical signal, process the electrical signal for adapting the first apparatus 110, and transmit the processed electrical signal to the first apparatus 110. Additionally or alternatively, the communication apparatus 120 may convert an electrical signal received from the first apparatus 110 into an optical signal, process the optical signal for adapting the second apparatus 130, and transmit the processed optical signal to the second apparatus 130 through the optical fiber. In the following description, a computing apparatus is described as an example for the first apparatus 110, and a PCIe apparatus that satisfies the PCIe standard is described as an example for the second apparatus 130. Merely by way of example, the communication protocol may be a first-generation PCIe protocol, a second-generation PCIe protocol, a third-generation PCIe protocol, a fourth-generation PCIe protocol, a fifth-generation PCIe protocol, etc.

The communication system 100 may be especially suitable for high-speed data transfer between the first apparatus and one or more second apparatuses. For instance, the communication system 100 may be used in medical applications. The one or more second apparatuses may include a storge apparatus of a medical apparatus, a processor of a medical apparatus, etc. The medical apparatus may include but not limited to an imaging apparatus. Merely by way of example, the imaging apparatus may include a positron emission tomography (PET) apparatus, a single photon emission computed tomography (SPECT) apparatus, a magnetic resonance imaging (MRI) apparatus, a positron emission tomography-computed tomography (PET-CT) apparatus, a single photon emission computed tomography-magnetic resonance imaging (SPECT-MRI) apparatus, etc. As another example, the medical apparatus may be a multi-modality (e.g., two-modality) apparatus to acquire a medical image and perform radiotherapy. For instance, the first apparatus 110 may be a computing apparatus configured to receive medical image data from the one or more second apparatuses and generate medical image(s) based on the medical image data. In some embodiments, the communication system 100 may be applied in other fields that require high-speed data transferring, such as cloud computing, surveillance video data/image data collection and analysis, or the like, or any combination thereof, which are not limited by the present disclosure.

According to an aspect of the present disclosure, a device for controlling the communication between apparatuses (briefly referred to as the control device) is provided. As shown in FIG. 1, the control device 140 provided in some embodiments may be implemented on the communication apparatus 120. The control device 140 may be configured to generate a connection signal in response to determining that a second apparatus 130 has established a new connection with the communication apparatus. The control device 140 may be further configured to generate a control signal based on the connection signal. Based on the control signal, the control device 140 may be configured to change, a connection state between the first apparatus 110 and the communication apparatus 120 to cause a new connection relationship between the first apparatus 110 and the second apparatus 130 to be established for communication between the first apparatus and the second apparatus. For example, the control device 140 may cause the first apparatus 110 to be disconnected with the communication apparatus 120 for a preset period and then cause the first apparatus 110 and the communication apparatus 120 to be re-connected (i.e., to cause a new connection to be established between the communication apparatus 120 and the first apparatus 110). Then the first apparatus 110 may be connected with the second apparatus 130. In some embodiments, the control device 140 is also referred to as a connection monitoring device.

Alternatively, the control device 140 may be partly implemented on the communication apparatus 120. As yet another example, the control device 140 may be communicatively connected with one or more components of the communication apparatus 120. More descriptions regarding the control device 140 may be found elsewhere in the present disclosure, for example, in FIG. 4, FIGS. 8-9, and the descriptions thereof.

Figure 2:
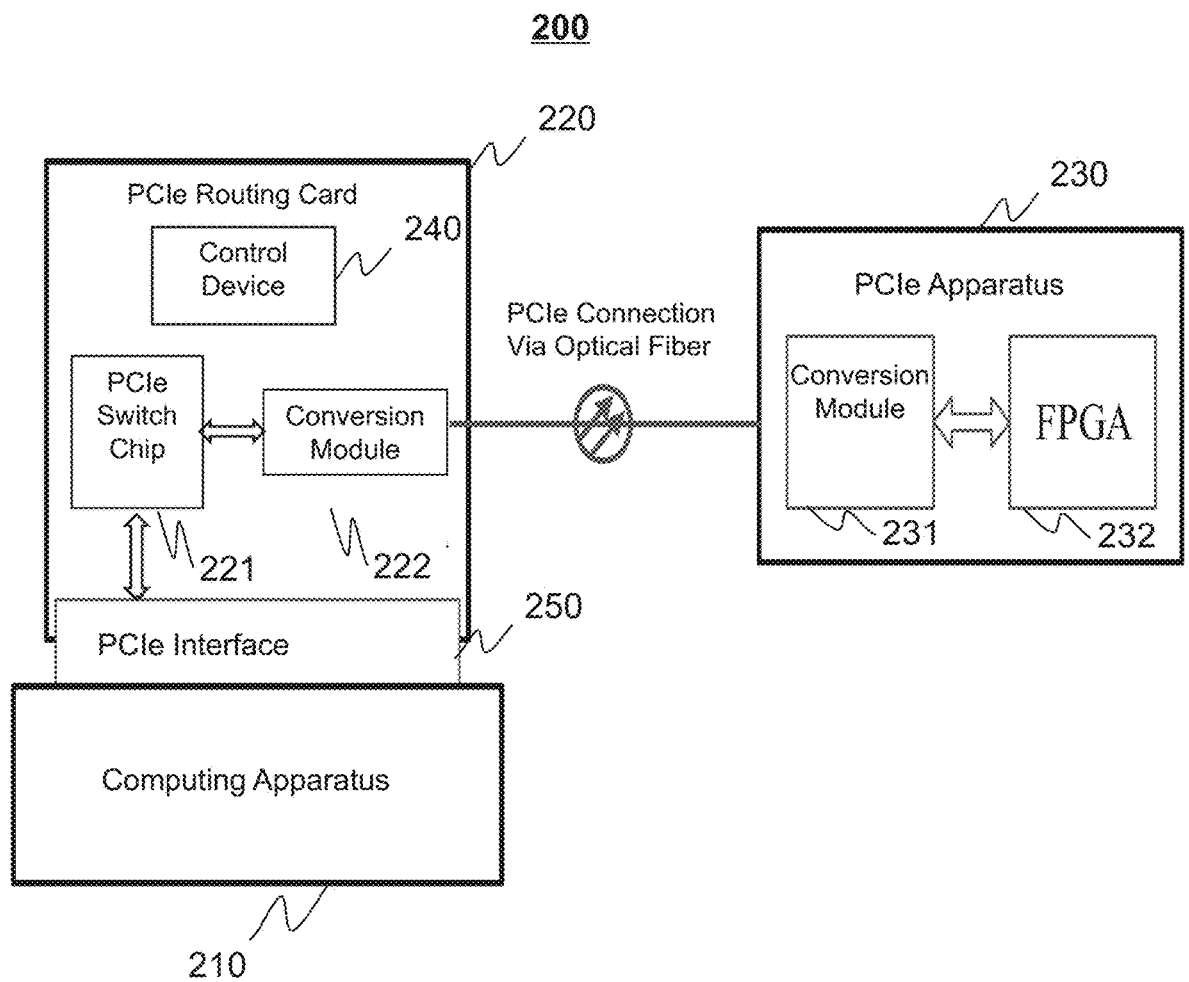
FIG. 2 is a schematic diagram of an exemplary communication system using the PCIe protocol according to some embodiments of the present disclosure.

FIG. 2 is a schematic diagram of an exemplary communication system using the PCIe protocol according to some embodiments of the present disclosure. As shown in FIG. 2, the first apparatus 110 may be a computing apparatus 210; the communication apparatus 120 may be a PCIe routing card 220; the second apparatus 130 may be a PCIe apparatus 230. As shown in FIG. 2, the computing apparatus 210 may be connected with the PCIe routing card 220 via a PCIe interface 250, and the PCIe routing card 220 may be connected with the PCIe apparatus 230 through an optical fiber, such that the computing apparatus 210 may communicate with the PCIe apparatus 230.

The PCIe routing card 220 may include a PCIe switch chip 221 and a conversion module 222. The PCIe switch chip 221 may be configured to expand the number of PCIe apparatuses than what is available from the computing apparatus 210 so that more PCIe apparatuses can be supported by the computing apparatus 210. The conversion module 222 may convert an optical signal into an electrical signal and/or convert an electrical signal to an optical signal. The PCIe apparatus 230 may include a conversion module 231 and a field programmable gate array (FPGA) 232.

In some embodiments, after the PCIe apparatus 230 establishes a new connection with the PCIe routing card 220, the control device 240 may be configured to change the connection state between the computing apparatus 210 and the PCIe routing card 220. For example, the control device 240 may cause the computing apparatus 210 to be disconnected with the PCIe routing card 220 for a preset period and then cause the computing apparatus 210 and the PCIe routing card 220 to be re-connected (i.e., to cause a new connection to be established between the PCIe routing card 220 and the computing apparatus 210). Then the computing apparatus 210 may be connected with the PCIe apparatus 230.

Figure 3:
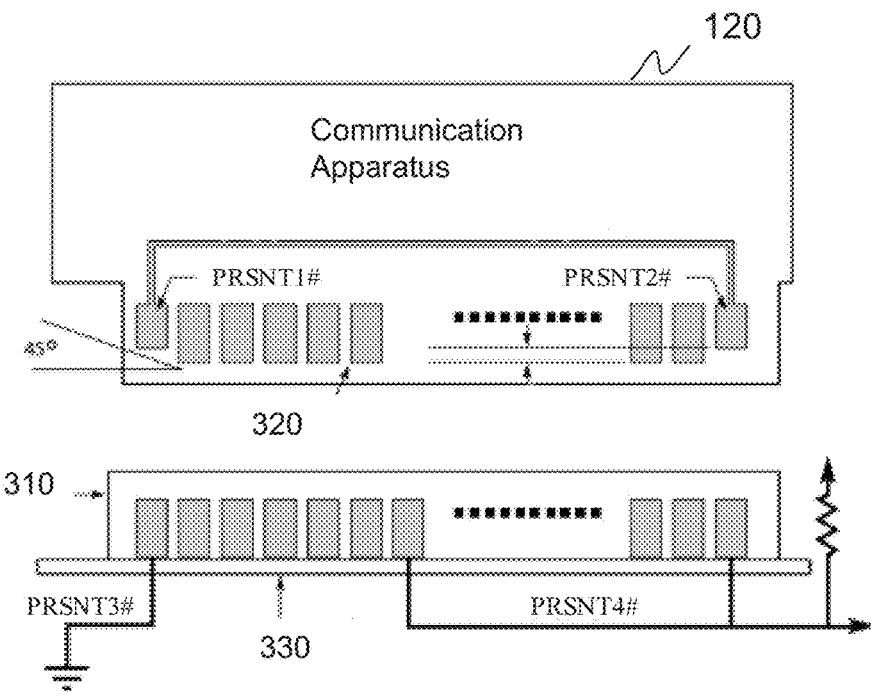
FIG. 3 is a schematic diagram illustrating an exemplary upstream link of a communication system according to some embodiments of the present disclosure.

FIG. 3 is a schematic diagram illustrating an exemplary upstream link of a communication system according to some embodiments of the present disclosure. For ease of understanding, before specifically introducing the device for controlling the communication between apparatuses (briefly referred to as the control device) provided by some embodiments of the present disclosure, the basic principle for controlling the connection between apparatuses provided by the present disclosure will be briefly described.

For example, the interface 150 may include a connecting finger 320 and the connecting finger 320 may be connected with a slot 310 on a mainboard 330 of the computing apparatus. When the computing apparatus is powered on and the communication apparatus 120 is also powered on, an upstream link including the computing apparatus and the communication apparatus 120 is normally connected. However, if the PCIe apparatus is powered on after the upstream link is normally connected, the computing apparatus does not recognize that there is a PCIe apparatus connected. In order for the PCIe apparatus to be recognized by the computing apparatus, the computing apparatus must be restarted. The downstream link (i.e., a link including the communication apparatus 120 and the PCIe apparatus) are interconnected by optical fibers, and thus only data links are interconnected. Since the communication apparatus 120 has been powered on and is working, detection pins (also referred to as "in-position detection pins) PRSNT#1 and PRSNT#2 of the communication apparatus 120 are conventionally connected by a single board wiring. There is no change in the connection relationship between the detection pins of the communication apparatus 120 after a PCIe apparatus is newly connected to the communication apparatus or is powered on after the computing apparatus is powered on. Thus, the computing apparatus does not recognize that a PCIe apparatus is connected. This is because for the computing apparatus, the communication apparatus 120 is always in position without any changes.

Figure 4:
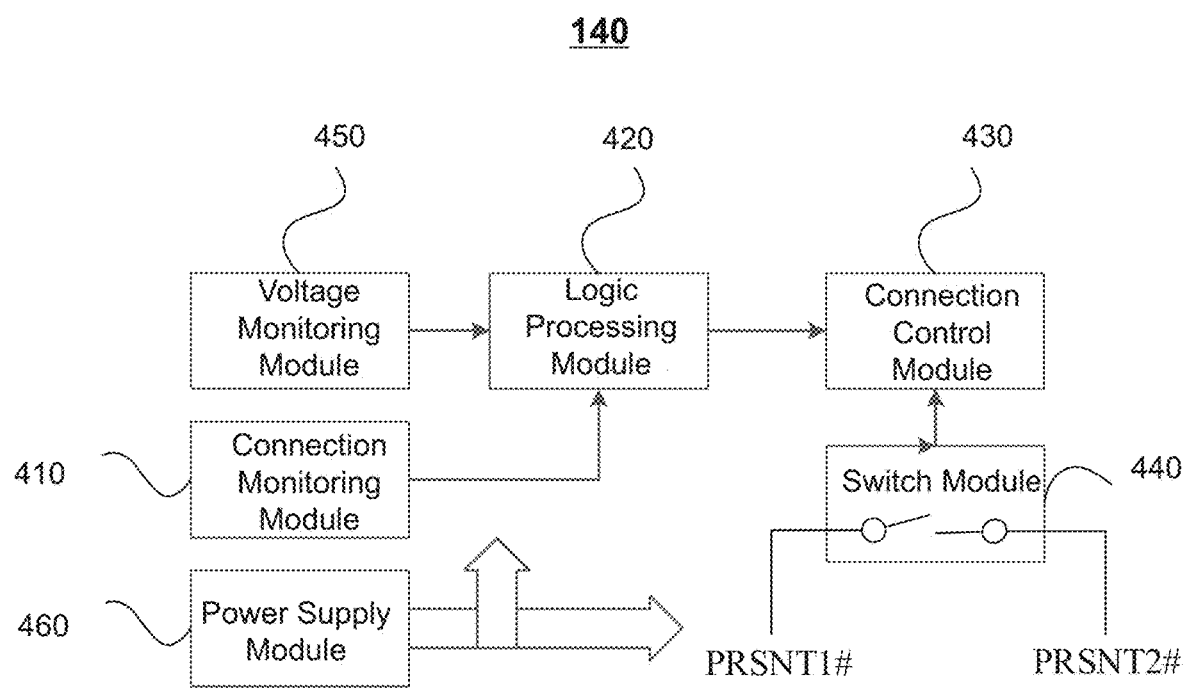
FIG. 4 is a schematic diagram illustrating the hardware/software components of an exemplary control device according to some embodiments of the present disclosure.

FIG. 4 is a schematic diagram illustrating the hardware/software components of an exemplary control device according to some embodiments of the present disclosure. Referring to FIG. 4, the control device 140 may include a connection monitoring module 410, a logic processing module 420, and a connection control module 430.

The connection monitoring module 410 may be connected with the logic processing module 420, and the logic processing module 420 may be connected with the connection control module 430. In some embodiments, an output end of the connection monitoring module 410 may be connected to a first input end of the logic processing module 420, and an output end of the logic processing module 420 may be connected to an input end of the connection control module 430. The connection monitoring module 410 may be configured to: in response to determining that a new connection has been established between the second apparatus 130 and the communication apparatus 120, and send a connection signal to the logic processing module 420. According to the connection signal, the logic processing module 420 may be configured to obtain a control signal, and output the control signal to the connection control module 430. According to the control signal, the connection control module 430 may be configured to change a connection state between the communication apparatus 120 and the first apparatus 110, so that a new connection is established between the first apparatus 110 and the communication apparatus 120. With this configuration, the control device provided by the present disclosure may enable the first apparatus 110 to recognize the new insertion or new connection of a second apparatus so that the first apparatus does not need to be restarted for communicating with the second apparatus and the second apparatus can communicate with each other. In this way, the usability, stability and maintainability of the communication system 100 can be improved.

Understandably, the first apparatus 110 may include but not limited to a desktop computer, a laptop computer, a server, or the like. The second apparatus 130 may include but not limited to, a downstream apparatus using a communication protocol such as a PCIe protocol, and the present disclosure does not impose any limitation on the communication protocol or additional second apparatuses.

In one of the exemplary embodiments, referring to FIG. 4, the control device 140 further may include a switch module 440, and the output end of the connection control module 430 may be connected with the switch module 440. Both ends of the switch module 440 may be connected with the detection pins (i.e., PRSNT1# and PRSNT2#) of the communication apparatus 120.

In some embodiments, the connection control module 430 may be configured to change the connection state of the communication apparatus 120 and the first apparatus 110 according to the control signal. For example, according to the control signal, the connection control module 430 may drive the switch module 440 to be turned on (e.g., be in an open state) for a preset period of time and then cause the switch module 240 to remain in a closed state (or a turned-off state). The control signal may include information regarding the preset period. In some embodiments, the preset period may be 1 second to 5 seconds, such as 2 seconds. In specific applications, the preset period may be set to a fixed value or an adjustable value according to actual working conditions. For instance, a user may adjust the preset period via a terminal.

When the switch module 440 is turned on, the detection pins (i.e., PRSNT1# and PRSNT2#) of the communication apparatus may be disconnected to cause the first apparatus to be communicatively disconnected with the communication apparatus. When the switch module 440 is turned off, the switch module may be configured to short-circuit the detection pins of the communication apparatus to cause a new connection to be established between the first apparatus and the communication apparatus.

Figure 5:
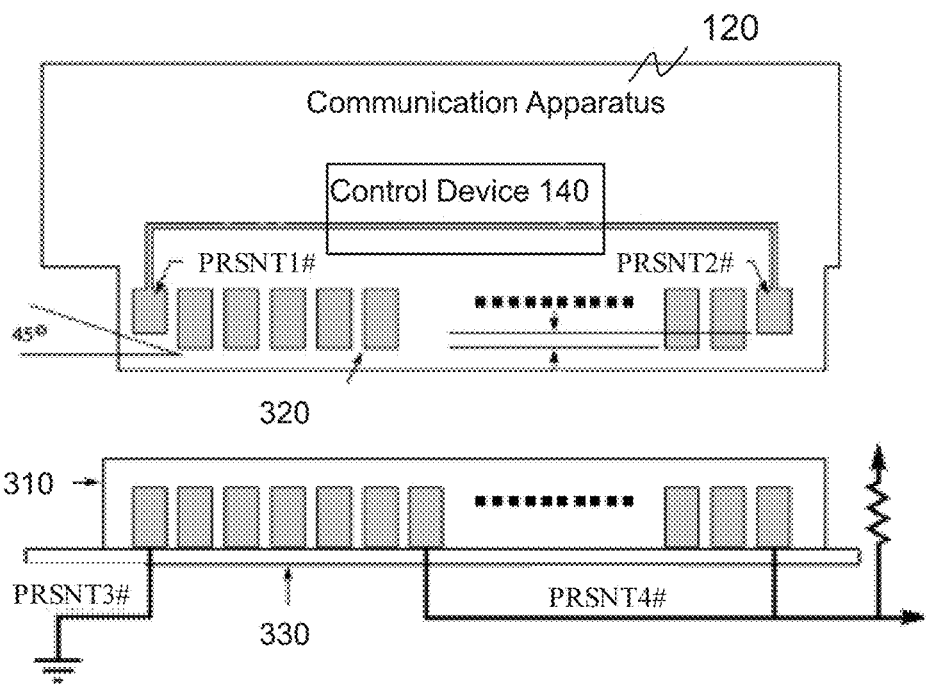
FIG. 5 is a schematic diagram illustrating the connection between the communication apparatus and the first apparatus according to some embodiments of the present disclosure.

FIG. 5 is a schematic diagram illustrating the connection between the communication apparatus and the first apparatus according to some embodiments of the present disclosure.

In some embodiments, as shown in FIG. 5, the communication apparatus 120 may include an interface 150 (e.g., a connecting finger), and a mainboard 330 of the first apparatus 110 may include at least one slot 310 (e.g., PCIe slot); the detection pins of the communication apparatus 120 may include a first detection pin PRSNT#1 of the interface 150 and a second detection pin PRSNT#2 of the interface 150. The slot 310 may include a third detection pin PRSNT3 and a fourth detection pin PRSNT#3. The third detection pin PRSNT#3 may be grounded, and the fourth detection pin PRSNT#4 may be connected to a slot power source. In some embodiments, the communication apparatus 120 may be electrically connected to the first apparatus 110. The interface 150 of the communication apparatus 120 may be connected with the slot 310 of the first apparatus 110. The first detection pin RPSNT#1 may be connected to the third detection pin PRSNT#3, and the second detection pin PRSNT#2 may be connected to the fourth detection pin PRSNT#4. Alternatively, the first detection pin PRSNT#1 may be connected to the fourth detection pin PRSNT#4, and the second detection pin PRSNT#2 may be connected to the third detection pin PRSNT#3.

In the following description, merely by way of example, the first detection pin RPSNT#1 is paired with the third detection pin PRSNT#3, and the second detection pin PRSNT#2 is paired with the fourth detection pin PRSNT#4. When the switch module 440 is turned on, the first detection pin may be disconnected with the second detection pin to generate a first logic level transition of a signal relating to a fourth detection pin. For instance, the first logic level transition may be a transition from a low-logic level to a high logic level. The first logic level transition may cause the upstream link to be in an inactive state. That is, the first apparatus 110 may be communicatively disconnected with the communication apparatus 120 in response to detecting the first logic level transition. The first apparatus 110 may declare a reset signal to the communication apparatus 120 through the slot 310. Specifically, the first apparatus 110 may be caused to turn off the slot clock and the slot power source. When the switch module 440 is in the closed state (or a turned-off state), the first detection pin may be connected with the second detection pin to generate a second logic level transition of a signal relating to the fourth detection pin. For example, the second logic level transition may be a transition from a high-logic level to a low-logic level. In response to detecting the second logic level transition of a signal relating to the fourth detection pin, the first apparatus 110 may cancel the reset signal through the slot 310, and redirect the communication apparatus link and allocate resources. That is: the new connection may be established between the first apparatus 110 and the communication apparatus 120. For example, the cancellation of the reset signal by the first apparatus 110 through the slot 310 may include that the first apparatus 110 turns on the slot power source and the slot clock. In other words, when the control device 140 detects that a second apparatus 130 is connected, the connection relationship between the communication apparatus 120 and the first apparatus 110 is reset.

In some embodiments, the initial state of the switch module 440 may be a closed state. That is, a default setting may be to cause the first detection pin PRSNT1 # and the second detection pin PRSNT2 # to remain in a short-circuited state. After a new connection is established between the second apparatus and the communication apparatus, the connection control module 430 may cause the switch module 440 to be turned on or turned off again according to the control signal. The switch module 440 may be a repeater or other types of switches, which should be selected reasonably according to actual working conditions. In some embodiments, the switch module 440 may need to keep the impedance small in the closed state, so as not to affect the short-circuiting of the first detection pin PRSNT1 # and the second detection pin PRSNT2 #(that is, the connecting finger of the communication apparatus 120 is connected to the slot in the first apparatus 110, and the third detection pin PRSNT3 # is short-circuited with the fourth detection pin PRSNT4 #).

In some embodiments, the control device 140 may further include a voltage monitoring module 450. An output end of the voltage monitoring module 450 may be connected to a second input end of the logic processing module 420. The voltage monitoring module 450 may be configured to monitor the first input voltage and the second input voltage. The first input voltage may be the voltage provided by the slot power source to the communication apparatus 120, and the second input voltage may be the input voltage of various modules of the control device 140. The voltage monitoring module 450 may be further configured to: in response to determining that the first input voltage is greater than a first threshold and the second input voltage is greater than a second threshold, send an enable signal to the logical processing module 420. In some embodiments, the first threshold and the second threshold may be preset or may be adjustable. The enabling signal may indicate a transition from a logic-high level to a logic-low level or a transition from a logic-low level to a logic-high level. The logic processing module 420 may also be configured to keep its output signal unchanged before receiving the enable signal. As an exemplary implementation, the slot 310 on the mainboard of the first apparatus 110 is connected to multiple slot power resources with different voltages, such as three types of power supplies: +12V, +3.3V, and +3.3VAUX. +12V and +3.3V power supplies may be required, while 3.3VAUX is optional. For instance, the first threshold may be 12V. The second threshold may range from 2.5V-3.5V, e.g., 3.3V. This configuration is to avoid an erroneous operation on the switch module 440 when the voltage of the slot 310 on the mainboard is not stable (such as when the first apparatus 110 is just powered on).

In some embodiments, the logic processing module 420 may be configured to obtain a control signal according to the connection signal. After receiving the enable signal, the logic processing module 420 may be configured to obtain or generate the control signal according to the connection signal. In some embodiments, with reference to FIG. 3, the input of the logic processing module 420 may come from the voltage monitoring module 450 and the output of the connection monitoring module 410. When the power supply of the slot 310 does not reach the first threshold, such as when the first apparatus 110 is just powered on, the output signal of the logic processing module 420 may remain unchanged. When the logic processing module 420 receives the enable signal that the power supply of the slot 310 exceeds the first preset threshold, the logic processing module 420 may monitor the output of the connection monitoring module 410. In response to determining that a new connection between the second apparatus 130 and the communication apparatus 120 is established, for example, when the output of the connection monitoring module 410 changes from a high logic level to a low level, the logic processing module 420 may output the control signal to the connection control module 430 to control the switch module 440 through the connection control module 430. Understandably, the logic processing module 420 may be a simple logic gate circuit or a more complex logic device. The present disclosure does not impose any restriction on this.

In some embodiments, the control device 140 may further include a power supply module 460 configured to convert the first input voltage into the second input voltage. The power supply module 460 may be used to supply power to the voltage monitoring module 450, the connection monitoring module 410, the logic processing module 420, and/or the connection control module 430. In some embodiments, the power supply module 460 may include, but is not limited to, a linear stabilized power supply. In some embodiments, the first input voltage may include the +12V input voltage provided by the slot 310, which may be converted to the power supply voltage required by each functional module of the control device 140 by the power supply module 460, such as 3.3V or 2.5V and so on. This configuration can ensure a stable second input voltage to supply power to each module of the control device 140 so that each module can work normally. In some embodiments, the power supply module 460 may include a linear regulated power supply chip with a small pressure difference to improve efficiency and stability.

Figure 6:
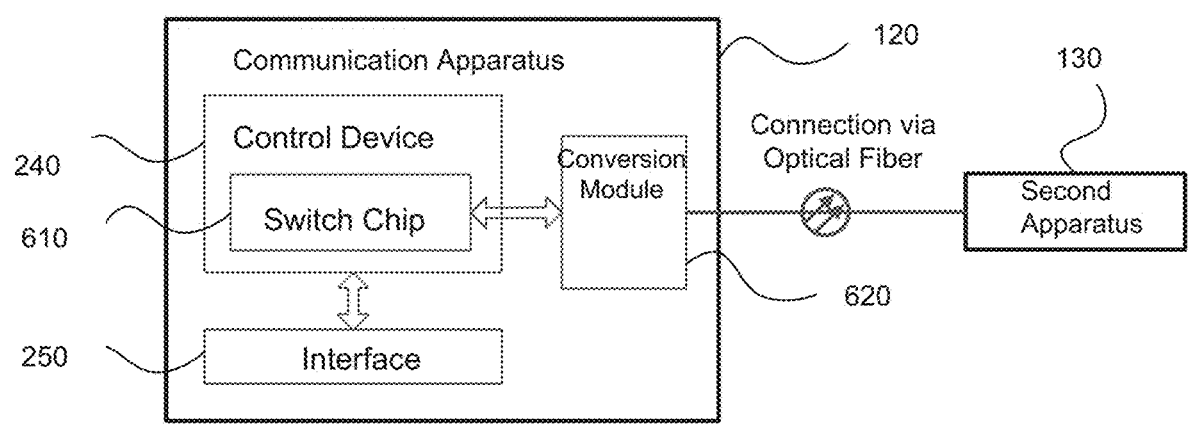
FIG. 6 is a schematic diagram illustrating the connection between the communication apparatus and the second apparatus according to some embodiments of the present disclosure.

FIG. 6 is a schematic diagram illustrating the connection between the communication apparatus and the second apparatus according to some embodiments of the present disclosure. It can be seen from FIG. 6 that the communication apparatus 120 may include an interface 150 for connecting the first apparatus 110 (e.g., a computing apparatus) and the control device 140. The communication apparatus 120 may include a conversion module 620. The conversion module 610 may be configured to perform a photoelectric conversion on data received from the second apparatus 130 to convert optical signals into electrical signals and transmit the electrical signals to the first apparatus 110. Additionally or alternatively, the conversion module 620 may perform a electro-optical conversion on data received from the first apparatus 110 to convert electrical signals into optical signals and transmit the optical signals to the second apparatus 130 via optical fiber.

In some embodiments, the connection monitoring module 410 may include a switch chip 610 of the communication apparatus 120. The connection monitoring module 410 may monitor whether the second apparatus 130 has established a new connection with the communication apparatus by monitoring whether there is a state change of a node switch signal (e.g., PEX_LANE_GOOD) of the switch chip 610. Since the communication apparatus 120 is connected with the second apparatus 130 through optical fiber, if the node switch signal transits from a logic-high level to a logic-low level or from a logic-low level to a logic-high level, the connection monitoring module 410 may determine that the second apparatus 130 has established a new connection with the communication apparatus. Use of the switch chip 610 in the communication apparatus as the connection monitoring module 410 of the control device 140 can reduce the cost of the control device while realizing the hot plugging function of PCIe apparatuses.

Additionally or alternatively, the connection monitoring module 410 may include processing circuits (e.g., in the form of a microprocessor, or a part of a microprocessor) configured to obtain the node switch signal from the switch chip 610. The connection monitoring module 410 may further determine that the second apparatus 130 has established a new connection with the communication apparatus according to the state change of a node switch signal (e.g., PEX_LANE_GOOD) of the switch chip 610.

Figure 7:
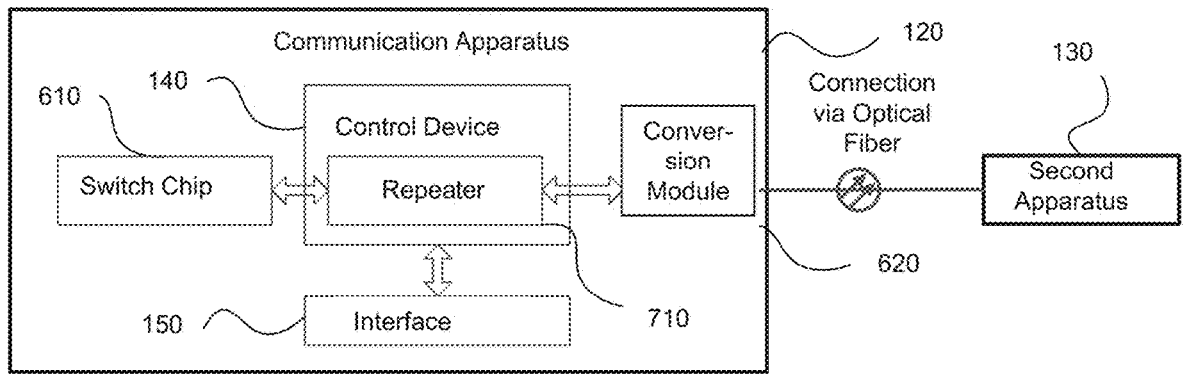
FIG. 7 is a schematic diagram illustrating the connection between the communication apparatus and the first apparatus according to some embodiments of the present disclosure.

FIG. 7 is a schematic diagram illustrating the connection between the communication apparatus and the first apparatus according to some embodiments of the present disclosure. As shown in FIG. 7, the connection monitoring module 410 may include a repeater 710. The repeater 710 may be connected with the switch chip 610 and/or the conversion module 620. To monitor whether the second apparatus 130 has established a new connection with the communication apparatus 120, the connection monitoring module 410 may monitor data recorded in the internal register of the repeater 710. The data recorded in the internal register may indicate a communication status between the communication apparatus 120 and the second apparatus 130. The connection monitoring module 410 may analyze the data recorded in the internal register and determine whether a new connection is established between the communication apparatus 120 and the second apparatus 130.

As another example, the repeater 710 may be implemented on the communication apparatus 120 but not as a part of the control device 140. The connection monitoring module 410 may include processing circuits (e.g., in the form of a microprocessor, or a part of a microprocessor) configured to obtain the data recorded in the internal register of the repeater 710 and determine whether the second apparatus 130 has established a new connection with the first apparatus 110.

According to another aspect of the present disclosure, a communication apparatus is provided. The communication apparatus (e.g., the communication apparatus 120) may include the control device 140 described in some embodiments of the present disclosure.

From the description of the above embodiments, it can be seen that, compared with the conventional manner, the control device, the communication apparatus, and the communication system 100 provided by the present disclosure have at least the following beneficial effects.

The control device 140 may detect, in real-time, whether the second apparatus 130 (e.g., a PCIe apparatus) has established a new connection with the communication apparatus 120. Additionally or alternatively, the control device 140 may control the connection state of the detection pins of the communication apparatus 120, and thus controlling the connection between the first apparatus 110 and the communication apparatus 120 in a hot plug manner. Therefore, the communication system 100 using the communication apparatus 120 with the control device 140 provided by the present disclosure does not impose any restriction on the power-on time of the second apparatus 130, and thus the second apparatus 130 may be powered on or connected to the communication apparatus 400 at any time, before or after the first apparatus 110 is powered on. The power supply design of the first apparatus 110 and the second apparatus 130*d* may not need to consider the requirements related to timing control, which greatly simplifies the complexity of the design and improves the design efficiency. Further, during the normal operation of the system, if the second apparatus 130 needs to be powered off for repair, replacement, or upgrade due to failure or maintenance, it is not necessary to restart the first apparatus 110 or restart the entire communication system 100. This allows the first apparatus 110 to interact with the second apparatus 130 without restarting, which improves the usability, stability, and maintainability of the communication system 100. As a result, system repair or maintenance time may be greatly reduced, which significantly improves work efficiency. When the communication system 100 is used in medical applications, the efficiency for medical diagnosis and/or treatment may be significantly improved. The patient may get appropriate treatment in time and suffer less from a disease.

Figure 8:
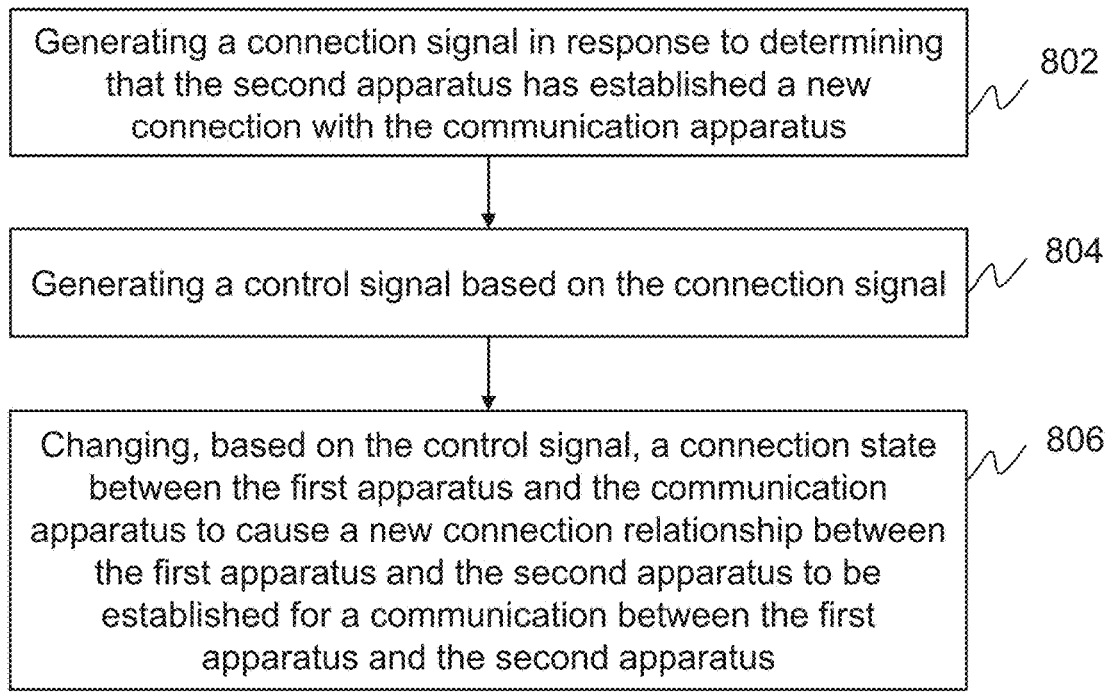
FIG. 8 is a flowchart illustrating an exemplary process for controlling a connection between a first apparatus and a second apparatus via a communication apparatus according to some embodiments of the present disclosure.

FIG. 8 is a flowchart illustrating an exemplary process for controlling a connection between a first apparatus and a second apparatus via a communication apparatus according to some embodiments of the present disclosure. The process 800 may be implemented by the control device 140 (or one or more modules shown in FIG. 4) in the communication system 100. The operations of the illustrated process presented below are intended to be illustrative. In some embodiments, the process 800 may be accomplished with one or more additional operations not described, and/or without one or more of the operations discussed. Additionally, the order in which the operations of the process 800 as illustrated in FIG. 8 and described below is not intended to be limiting.

In 802, the control device 140 may generate a connection signal in response to determining that a second apparatus has established a new connection with the communication apparatus. In some embodiments, the operation 802 may be performed by the connection monitoring module 410. Merely by way of example, the communication apparatus (e.g., the communication apparatus 120 in the communication system 100) may include a routing component based on a Peripheral Component Interconnect Express (PCIe) protocol, and the second apparatus (e.g., the second apparatus 130 in the communication system 100) may include a PCIe device.

In some embodiments, the connection monitoring module 410 may determine whether the second apparatus 130 has established the new connection with the communication apparatus 120 base on whether there is a state change of a node switching signal of a switch chip of the communication apparatus 120. In some embodiments, in response to determining that the node switching signal changes from a logic-high level to a logic-low level or from a logic-low level to a logic-high level, the connection monitoring module 410 may determine that the second apparatus has established the new connection with the communication apparatus. Alternatively, the connection monitoring module 410 may determine whether the second apparatus has established the new connection with the communication apparatus based on data of the second apparatus recorded in an internal register of a repeater of the control device 140.

As yet another example, the connection monitoring module 410 may determine whether the second apparatus has established the new connection with the communication apparatus based on a user input. For instance, a user may provide a user input through a terminal to indicate that a new connection is established between one or more second apparatuses 130 and the communication apparatus 120.

In 804, the control device 140 may generate a control signal based on the connection signal. In some embodiments, the operation 804 may be performed by the logic processing module 420.

In some embodiments, before generating the control signal, the logic processing module 420 may determine whether an enable signal has been received. In response to a determination that the enable signal has been received, the logic processing module 420 may obtain or generate the control signal. Alternatively, before sending the control signal to the connection control module 430, the logic processing module 420 may determine whether an enable signal has been received. In response to a determination that the enable signal has been received, the logic processing module 420 may obtain or generate the control signal, the logic processing module 420 may send the control signal to the connection control module 430.

In some embodiments, before obtaining, generating, or sending the control signal, the logic processing module 420 may check whether a data transferring process is being performed between the first apparatus 110 and the communication apparatus 120. If there is a data transferring process between the first apparatus 110 and the communication apparatus 120 at the present, the disconnection of the first apparatus 110 and the communication apparatus 120 may interrupt the data transferring process. In response to a determination that a data transferring process is being performed between the first apparatus 110 and the communication apparatus 120, the logic processing module 420 may obtain, generate, or send the control signal to the connection control module 430 after the data transferring process is completed. As another example, in response to a determination that a data transferring process is performed between the first apparatus 110 and the communication apparatus 120, the logic processing module 420 may cause an inquiring message to be generated. The inquiring message may be presented to a user via a terminal. The inquiring message may be used to provide some options for the user, such as: waiting for the data transferring process to be completed and then establishing the new connection between the first apparatus 110 and the second apparatus 130; interrupting the data transferring process immediately and then establishing the new connection between the first apparatus 110 and the second apparatus 130; canceling the establishment of the new connection between the first apparatus 110 and the second apparatus 130, or the like, or any combination thereof. The user may provide a user instruction, e.g., by selecting one of the provided options, via the terminal. The logic processing module 420 may determine when and/or whether to obtain, generate, or send the control signal to the connection control module 430 based on the user instruction.

In 806, the control device 140 may change, based on the control signal, a connection state between the first apparatus and the communication apparatus to cause a new connection relationship between the first apparatus and the second apparatus to be established for communication between the first apparatus and the second apparatus. In some embodiments, operation 806 may be performed by the connection control module 430.

To change the connection state between the communication apparatus 120 and the first apparatus 110, the connection control module 430 may be configured to cause, based on the control signal, a switch module 440 to be turned on, and then after a preset period, cause the switch module 440 to be turned off. When the switch module 440 is turned on, detection pins of the communication apparatus 120 are disconnected to cause the first apparatus to be communicatively disconnected with the communication apparatus 120. When the switch module 440 is turned off, the switch module 440 is configured to short-circuit the detection pins of the communication apparatus 120 to cause a new connection to be established between the first apparatus and the communication apparatus 120.

In some embodiments, when the switch module is turned on, a first detection pin of the communication apparatus 120 is disconnected with a second detection pin of the communication apparatus 120 to generate a first logic level transition of a signal relating to the fourth detection pin. The first logic level transition may cause the first apparatus 110 to be communicatively disconnected with the communication apparatus 120. For instance, the first apparatus 110 may be caused to turn off a slot clock and the slot power source. When the switch module 440 is turned off, the first detection pin may be connected with the second detection pin to generate a second logic level transition of a signal relating to the fourth detection pin. The second logic level transition may cause the new connection to be established between the first apparatus 110 and the communication apparatus 120. For example, the first apparatus 110 may be caused to turn on the slot clock and the slot power source. The first apparatus 110 may also need to identify the second apparatus 130 (or multiple second apparatuses 130) and reallocate resources relating to the second apparatus 130.

Alternatively, the first apparatus 110 may be communicatively disconnected with the communication apparatus 120 by directly sending a reset signal to the communication apparatus 120. Upon receiving the reset signal, the communication apparatus 120 may be disconnected from the first apparatus 110 for a preset period. The first apparatus 110 does not need to turn off the slot clock and the slot power source. Then after the preset period, the communication apparatus 120 may be connected with the first apparatus. A new connection between the communication apparatus 120 and the first apparatus 110 may be automatically established. The first apparatus 110 does not need to turn on the slot clock and the slot power source.

It should be noted that the above description regarding the process 800 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, one or more operations may be omitted and/or one or more additional operations may be added.

Figure 9:
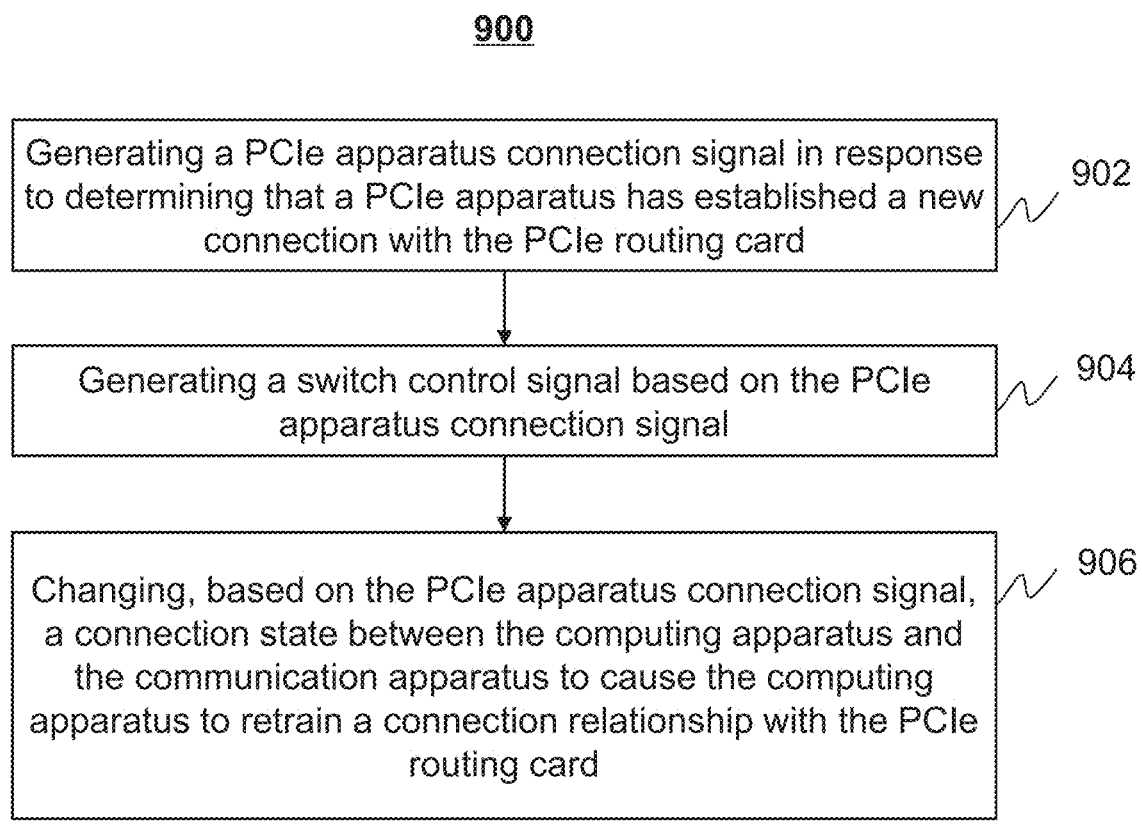
FIG. 9 is a flowchart illustrating an exemplary process for controlling a connection between a computing apparatus and a PCIe apparatus via a PCIe routing card according to some embodiments of the present disclosure.

FIG. 9 is a flowchart illustrating an exemplary process for controlling a connection between a computing apparatus and a PCIe apparatus via a PCIe routing card according to some embodiments of the present disclosure. The process 900 may be implemented by the control device 140 (or one or more modules shown in FIG. 4) in the communication system 100. The operations of the illustrated process presented below are intended to be illustrative. In some embodiments, the process 900 may be accomplished with one or more additional operations not described, and/or without one or more of the operations discussed. Additionally, the order in which the operations of the process 900 as illustrated in FIG. 9 and described below is not intended to be limiting.

In 902, the control device 140 may generate a PCIe apparatus connection signal in response to determining that a PCIe apparatus has established a new connection with the PCIe routing card.

In 904, the control device 140 may generate a switch control signal based on the PCIe apparatus connection signal.

In 906, the control device 140 may change, based on the PCIe apparatus connection signal, a connection state between the computing apparatus and the communication apparatus to cause the computing apparatus to retrain a connection relationship with the PCIe routing card.

Figure 10:
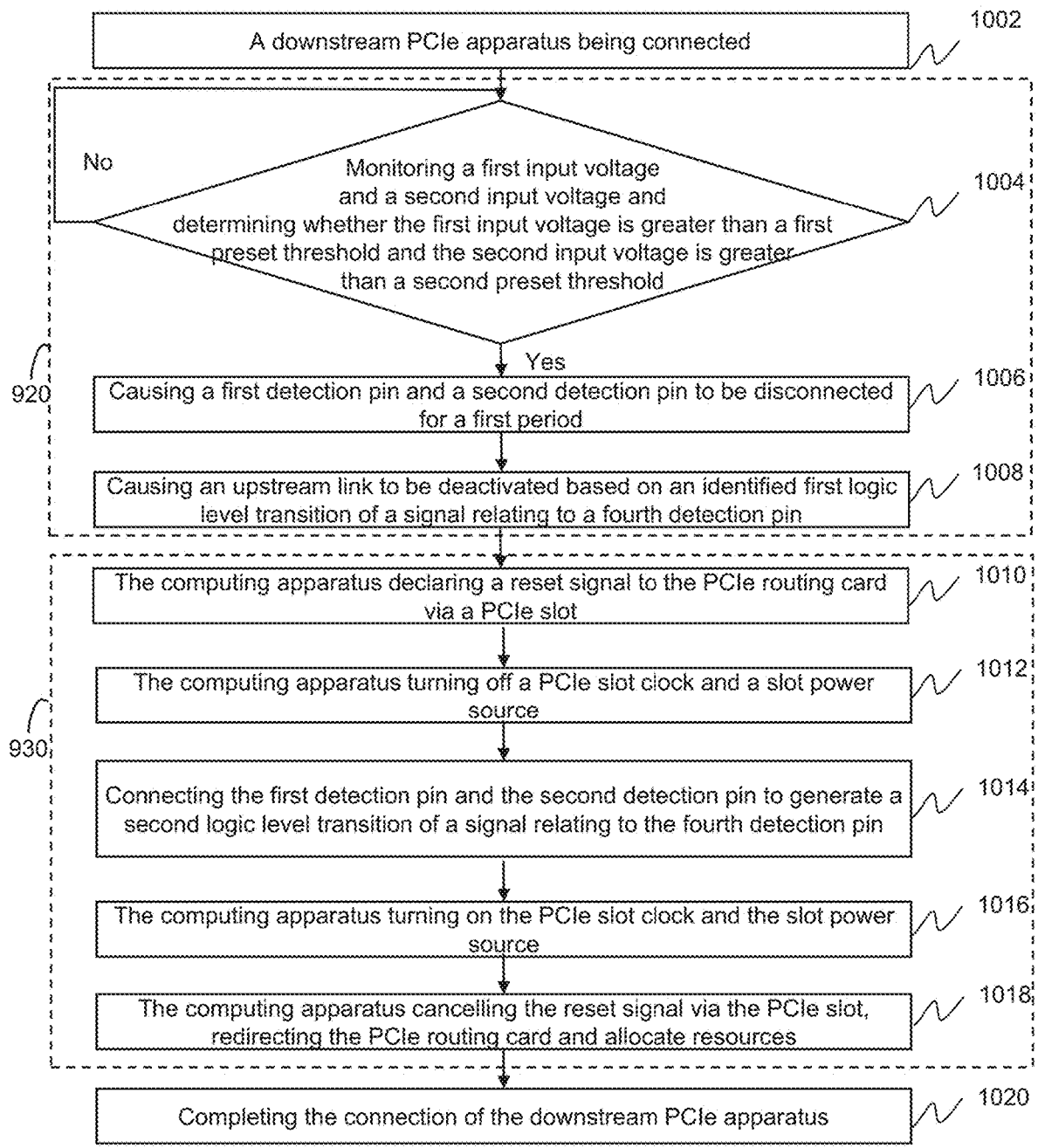
FIG. 10 is a flowchart illustrating an exemplary process for controlling a connection between a computing apparatus and a PCIe apparatus via a PCIe routing card according to some embodiments of the present disclosure.

More details regarding operations 902-906 may be found elsewhere in the present disclosure, for example, in FIG. 10 and the descriptions thereof.

FIG. 10 is a flowchart illustrating an exemplary process for controlling a connection between a computing apparatus and a PCIe apparatus via a PCIe routing card according to some embodiments of the present disclosure. The process 1000 may be implemented by one or more components of the communication system 100, such as the control device 140 (or one or more modules shown in FIG. 4), the first apparatus 110 (e.g., a computing apparatus), a communication apparatus (e.g., a PCIe routing card), and a second apparatus 130 (e.g., a PCIe apparatus). The operations of the illustrated process presented below are intended to be illustrative. In some embodiments, the process 1000 may be accomplished with one or more additional operations not described, and/or without one or more of the operations discussed. Additionally, the order in which the operations of the process 1000 as illustrated in FIG. 10 and described below is not intended to be limiting.

In 1002, a downstream PCIe apparatus is connected. That is, a PCIe apparatus (i.e., a second apparatus) has established a new connection with the PCIe routing card (i.e., the communication apparatus).

In some embodiments, operation 904 of the process 900 may be performed in a manner similar to operations 1004-1008.

In 1004, the control device 140 may monitor a first input voltage and a second input voltage, and determine whether the first input voltage is greater than a first preset threshold and the second input voltage is greater than a second preset threshold.

In 1006, the control device 140 may cause a first detection pin and a second detection pin to be disconnected for the first period.

In 1008, the control device 140 may cause an upstream link to be deactivated based on an identified first logic level transition of a signal relating to a fourth detection pin. The upstream link may be, for example, the connection between the computing apparatus and the PCIe routing card.

In some embodiments, operation 906 of the process 900 may be performed in a manner similar to operations 1010-1018.

In 1010, the computing apparatus may declare a reset signal to the PCIe routing card via a PCIe slot.

In 1012, the computing apparatus may turn off a PCIe slot clock and a slot power source.

In 1014, the control device 140 may connect the first detection pin and the second detection pin a second logic level transition of a signal relating to the fourth detection pin.

In 1016, the computing apparatus may turn on the PCIe slot clock and the slot power source.

In 1018, the computing apparatus may cancel the reset signal via the PCIe slot, redirect the PCIe routing card and allocate resources. As used herein, the phrase "redirecting the PCIe routing card" refers to establish a new connection with the PCIe routing card and identify the PCIe apparatus. The phrase "allocate resources" refers to allocating an identification code, memory space, bandwidth, or other types of available resources to the PCIe routing card and/or the PCIe apparatus.

In 1020, the connection of the downstream PCIe apparatus may be completed. That is, the PCIe apparatus has established a new connection relationship with the computing apparatus. The computing apparatus can identify the PCIe apparatus and communicate with the PCIe apparatus.

It should be noted that the above description regarding the process 1000 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For instance, operations 1012 and 1016 may be omitted.

According to another present of the present disclosure, a computing apparatus-readable storage medium with computing apparatus-executable instructions stored on the computing apparatus-readable storage medium is provided. The storage medium may be a non-transitory medium. When the computing apparatus-executable instructions are executed, the method for controlling the connection between a first apparatus and a second apparatus via a communication apparatus may be executed. Operations of the control method have been described in detail above, and will not be repeated here.

The readable storage medium of some embodiments of the present disclosure may adopt any combination of one or more computing apparatus readable media. The readable medium may be a computing apparatus readable signal medium or a computing apparatus readable storage medium. The computing apparatus-readable storage medium may be, for example, but not limited to, an electrical, magnetic, optical, electromagnetic, infrared, or semiconductor system, apparatus, or device, or a combination of any of the above. More specific examples (non-exhaustive list) of computing apparatus-readable storage media may include electrical connections with one or more wires, portable computing apparatus hard disks, hard disks, random connection memory (RAM), read-only memory (ROM), Erasable programmable read-only memory (EPROM or flash memory), optical fiber, portable compact disk read-only memory (CD-ROM), optical storage device, magnetic storage device, or any suitable combination of the above. In this document, a computing apparatus-readable storage medium may be any tangible medium that contains or stores a program, and the program may be used by or in combination with an instruction execution system, apparatus, or device.

The computing apparatus-readable signal medium may include a data signal propagated in baseband or as a part of a carrier wave, and computing apparatus-readable program code may be stored in the medium. This propagated data signal may be in various forms, including but not limited to electromagnetic signals, optical signals, or any suitable combination of the foregoing. The computing apparatus-readable signal medium may also be any computing apparatus-readable medium other than the computing apparatus-readable storage medium. The computing apparatus-readable medium may send, propagate, or transmit the program for use by or in combination with the instruction execution system, apparatus, or device.

According to yet another aspect of the present disclosure, a system for controlling a connection between a first apparatus and a second apparatus via a communication apparatus is provided. The system may include at least one non-transitory storage medium including a set of instructions for controlling a connection, via a communication apparatus, between a first apparatus and a second apparatus; and at least one processor in communication with the at least one non-transitory storage medium. When executing the set of instructions, the at least one processor is configured to cause the system to perform operations including generating a connection signal in response to determining that the second apparatus has established a new connection with the communication apparatus; generating a control signal based on the connection signal; and changing, based on the control signal, a connection state between the first apparatus and the communication apparatus to cause a new connection relationship between the first apparatus and the second apparatus to be established for communication between the first apparatus and the second apparatus.

In some embodiments, the processor may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "some embodiments," and "some embodiments" mean that a particular feature, structure or characteristic described in connection with the embodiment is may included in at least one embodiment of the present disclosure. Therefore, it is emphasized and should be appreciated that two or more references to "some embodiments" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computing apparatus program product embodied in one or more computing apparatus readable media having computing apparatus readable program code embodied thereon.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

What is claimed is:

1. A method implemented on a device for controlling a connection between apparatuses, the method comprising:
generating a connection signal in response to determining that a second apparatus has established a new connection with a communication apparatus;
generating a control signal based on the connection signal; and
changing, based on the control signal, a connection state between a first apparatus and the communication apparatus to cause a new connection relationship between the first apparatus and the second apparatus to be established, wherein the changing, based on the control signal, a connection state between the first apparatus and the communication apparatus comprises:
disconnecting, based on the control signal, the first apparatus with the communication apparatus, and
after a preset period, causing a new connection to be established between the first apparatus and the communication apparatus.

2. The method of claim 1, wherein the communication apparatus includes a routing component based on a Peripheral Component Interconnect Express (PCIe) protocol, and the second apparatus includes a PCIe device.

3. The method of claim 1, wherein the changing, based on the control signal, a connection state between the first apparatus and the communication apparatus comprises:
disconnecting, based on the control signal, detection pins of the communication apparatus to cause the first apparatus to be communicatively disconnected with the communication apparatus, and
after the preset period since the detection pins are disconnected, connecting the detection pins of the communication apparatus to cause the new connection to be established between the first apparatus and the communication apparatus.

4. The method of claim 3, wherein disconnecting, based on the control signal, detection pins of the communication apparatus to cause the first apparatus to be communicatively disconnected with the communication apparatus includes:
disconnecting a first detection pin with a second detection pin to generate a first logic level transition of a signal relating to a fourth detection pin, the first logic level transition causing the first apparatus to be communicatively disconnected with the communication apparatus, wherein
the first detection pin and the second detection pin are disposed in an interface of the communication apparatus, a third detection pin and the fourth detection pin being disposed in an interface of the first apparatus.

5. The method of claim 4, wherein the connecting the detection pins of the communication apparatus to cause a new connection to be established between the first apparatus and the communication apparatus includes:
connecting the first detection pin with the second detection pin to generate a second logic level transition of a signal relating to the fourth detection pin, the second logic level transition causing the new connection to be established between the first apparatus and the communication apparatus.

6. The method of claim 5, wherein:
the interface of the first apparatus includes a slot,
the third detection pin is grounded, and
the fourth detection pin is connected with a slot power source.

7. The method of claim 6, wherein:
to cause the first apparatus to be communicatively disconnected with the communication apparatus, the first logic level transition causes the first apparatus to turn off a slot clock and the slot power source; and
to cause the new connection to be established between the first apparatus and the communication apparatus, the second logic level transition causes the first apparatus to turn on the slot clock and the slot power source.

8. The method of claim 3, wherein an initial state of the detection pins is a turned-off state.

9. The method of claim 1, further comprising:
monitoring a first input voltage of the communication apparatus and a second input voltage of the device; and
in response to a determination that the first input voltage is greater than a first threshold and the second input voltage is greater than a second threshold, generating an enable signal.

10. The method of claim 9, wherein the generating an enable signal comprises:
in response to receiving the enable signal, generating, based on the connection signal, the control signal.

11. The method of claim 9, wherein the enable signal indicates a transition from a logic-high level to a logic-low level or a transition from a logic-low level to a logic-high level.

12. The method of claim 9, further comprising:
converting the first input voltage to the second input voltage.

13. The method of claim 1, wherein the determining that the second apparatus has established a new connection with the communication apparatus, the method further comprises:
determining that the second apparatus has established the new connection with the communication apparatus based on data of the second apparatus recorded in an internal register of a repeater of the device.

14. The method of claim 1, wherein the determining that the second apparatus has established a new connection with the communication apparatus comprises:
  determining that there is a state change of a node switching signal of a switch chip of the device.

15. The method of claim 14, wherein the determining that the second apparatus has established a new connection with the communication apparatus further comprises:
  in response to determining that the node switching signal transits from a logic-high level to a logic-low level or from a logic-low level to a logic-high level, determining that the second apparatus has established the new connection with the communication apparatus.

16. The method of claim 1, wherein the disconnecting, based on the control signal, the first apparatus with the communication apparatus, and after a preset period, causing a new connection to be established between the first apparatus and the communication apparatus includes:
  disconnecting a first detection pin with a second detection pin to generate a first logic level transition of a signal relating to a fourth detection pin of the first apparatus, the first logic level transition causing the first apparatus to be communicatively disconnected with the communication apparatus.

17. The method of claim 16, wherein
  the first detection pin and the second detection pin are disposed in an interface of the communication apparatus, a third detection pin and the fourth detection pin are disposed in an interface of the first apparatus.

18. The method of claim 1, wherein the second apparatus and the communication apparatus are connected via an optical fiber.

19. A system, comprising:
  at least one non-transitory storage medium including a set of instructions for controlling a connection between apparatuses; and
  at least one processor in communication with the at least one non-transitory storage medium, wherein when executing the set of instructions, the at least one processor is configured to cause the system to perform operations including:
    generating a connection signal in response to determining that a second apparatus has established a new connection with a communication apparatus;
    generating a control signal based on the connection signal; and
    changing, based on the control signal, a connection state between a first apparatus and the communication apparatus to cause a new connection relationship between the first apparatus and the second apparatus to be established, wherein the changing, based on the control signal, a connection state between the first apparatus and the communication apparatus comprises:
      disconnecting, based on the control signal, the first apparatus with the communication apparatus, and
      after a preset period, causing a new connection to be established between the first apparatus and the communication apparatus.

20. A non-transitory computer readable medium, comprising at least one set of instructions, wherein when executed by at least one processor of a computing device, the at least one set of instructions direct the at least one processor to perform operations including:
  generating a connection signal in response to determining that a second apparatus has established a new connection with a communication apparatus;
  generating a control signal based on the connection signal; and
  changing, based on the control signal, a connection state between a first apparatus and the communication apparatus to cause a new connection relationship between the first apparatus and the second apparatus to be established, wherein the changing, based on the control signal, a connection state between the first apparatus and the communication apparatus comprises:
    disconnecting, based on the control signal, the first apparatus with the communication apparatus, and
    after a preset period, causing a new connection to be established between the first apparatus and the communication apparatus.

\* \* \* \* \*